United States Patent
Krueger et al.

(10) Patent No.: US 11,385,518 B2
(45) Date of Patent: Jul. 12, 2022

(54) LOW-ENERGY ELECTRO-OPTIC MODULATOR

(71) Applicant: Honeywell International Inc., Morris Plains, NJ (US)

(72) Inventors: Neil A. Krueger, Saint Paul, MN (US); Matthew Wade Puckett, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 60 days.

(21) Appl. No.: 16/800,977

(22) Filed: Feb. 25, 2020

(65) Prior Publication Data

US 2021/0263388 A1     Aug. 26, 2021

(51) Int. Cl.
*G02F 1/225*     (2006.01)
*G02B 6/35*      (2006.01)
*H01S 3/083*     (2006.01)

(52) U.S. Cl.
CPC ......... *G02F 1/2255* (2013.01); *G02B 6/3512* (2013.01); *H01S 3/083* (2013.01)

(58) Field of Classification Search
CPC ...... G02F 1/2255; G02B 6/3512; H01S 3/083
See application file for complete search history.

(56) References Cited

U.S. PATENT DOCUMENTS

| | | | |
|---|---|---|---|
| 7,062,131 B2 | 6/2006 | Ilchenko | |
| 7,356,214 B2 | 4/2008 | Ilchenko | |
| 7,397,987 B2 | 7/2008 | Witzens et al. | |
| 9,746,743 B1 | 8/2017 | Rabiei | |
| 9,904,015 B2 | 2/2018 | Taylor | |
| 9,912,413 B1 | 3/2018 | Dupuis et al. | |
| 10,126,506 B2 | 11/2018 | Mower et al. | |
| 10,345,674 B2 | 7/2019 | Middlebrook et al. | |

(Continued)

FOREIGN PATENT DOCUMENTS

| CN | 106921106 A | 7/2017 |
|---|---|---|
| WO | 2009048572 A1 | 4/2009 |

OTHER PUBLICATIONS

Gevorgyan et al., Triply resonant coupled-cavity electro-optic modulators for RF to optical signal conversion, vol. 28, No. 1 / Jan. 6, 2020 / Optics Express 7 (Year: 2020).*

(Continued)

*Primary Examiner* — Peter Radkowski
(74) *Attorney, Agent, or Firm* — Fogg & Powers LLC

(57) ABSTRACT

An electro-optic modulator comprises a resonator comprising a first waveguide having a first end and second end; a first grating at the first end; and a second grating at the second end. An input channel is in communication with the resonator, and comprises a second waveguide having a first end and second end; an input port at the first end; a third grating at the second end; and a first coupler configured to couple light between the second waveguide and the first waveguide. An output channel is in communication with the resonator, and comprises a third waveguide having a first end and second end; an all-pass filter at the first end; a readout port at the second end; and a second coupler configured to couple light between the first and third waveguides. The all-pass filter is configured to adjust a coupling strength between the second coupler and the readout port.

20 Claims, 4 Drawing Sheets

(56) References Cited

U.S. PATENT DOCUMENTS

| | | |
|---|---|---|
| 2015/0355410 A1 | 12/2015 | Park et al. |
| 2017/0153391 A1 | 6/2017 | Verslegers et al. |
| 2018/0284561 A1 | 10/2018 | Phare et al. |
| 2019/0227350 A1 | 7/2019 | Puckett et al. |

OTHER PUBLICATIONS

Huang et al., High-power sub-kHz linewidth lasers fully integrated on silicon, vol. 6, No. 6 / Jun. 2019 / Optica (Year: 2019).*
Kharel et al. Ultra-high-Q phononic resonators on-chip at cryogenic temperatures, APL Photonics 3, 066101 (2018); https://doi.org/10.1063/1.5026798 (Year: 2018).*
Komljenovic et al. Widely-Tunable Ring-Resonator Semiconductor Lasers, Appl. Sci. 2017, 7(7), 732; https://doi.org/10.3390/app7070732 (Year: 2017).*
S. Srinivasan, M. Davenport, T. Komljenovic, J. Hulme, D. T. Spencer and J. E. Bowers, "Coupled-Ring-Resonator-Mirror-Based Heterogeneous III-V Silicon Tunable Laser," in IEEE Photonics Journal, vol. 7, No. 3, pp. 1-8, Jun. 2015, Art No. 2700908, doi: 10.1109/JPHOT.2015.2428255 (Year: 2015).*
B. Song, Y. Liu, S. Ristic, and J. Klamkin, "Tunable 3D Hybrid Integrated Silicon Photonic External Cavity Laser," in Conference on Lasers and Electro-Optics, OSA Technical Digest (online) (Optical Society of America, 2017), paper AM4A.3. (Year: 2017).*
Wang et al., 2017. "III-V-on-Silicon Photonic Integrated Circuits for Spectroscopic Sensing in the 2-4 μm Wavelength Range" Sensors 17, No. 8: 1788. https://doi.org/10.3390/s17081788 (Year: 2017).*
Saber et al., "Transversely coupled Fabry-Perot resonators with Bragg grating reflectors," Opt. Lett. 43, 13-16 (2018) (Year: 2018).*
Kroesen et al., "Electro-optical tunable waveguide embedded multiscan Bragg gratings in lithium niobate by direct femtosecond laser writing," Opt. Express 22, 23339-23348 (2014) (Year: 2014).*
Komljenovic et al., "Widely Tunable Narrow-Linewidth Monolithically Integrated External-Cavity Semiconductor Lasers," in IEEE Journal of Selected Topics in Quantum Electronics, vol. 21, No. 6, pp. 214-222, Nov.-Dec. 2015, Art No. 1501909, doi: 10.1109/JSTQE.2015.2422752. (Year: 2015).*
Chen et al., "Moving toward optoelectronic logic circuits for visible light: a chalcogenide glass single-mode single-polarization optical waveguide switch", Applied Optics, Feb. 10, 2017, pp. 1405-1412, vol. 56, No. 5, Optical Society of America.

* cited by examiner

LOW-ENERGY ELECTRO-OPTIC MODULATOR

BACKGROUND

There is a need in various communication and sensing applications for electro-optic modulators (EOMs), which convert data from the electrical domain to the optical domain to transmit information. For example, the transmitted optical power changes in response to the electrical voltage applied to the EOM. Traditionally, this is accomplished with a Mach-Zehnder interferometer configuration containing two "arms", with one arm containing an EOM that controls its phase relative to the other arm and results in the optical signal traversing the two arms to interfere constructively or destructively. Typically these devices are large, as they rely on a phase shift between the two arms and the strength of the electro-optic effect requires light to propagate many millimeters such that the magnitude of the phase shift is sufficient.

In order to accommodate higher signal bandwidths and reduce energy costs, it is highly desirable to realize EOMs with low size, weight, and power (SWaP) consumption, as well as a short photon lifetime and an energy-per-bit (EPB) on the order of a few attojoules. Such low EPB has become increasingly interesting for interfacing with superconducting circuits operating at cryogenic temperatures. It has been shown that transferring information from cryogenic to room temperature is substantially less efficient along an entirely electrical pathway, as opposed to converting electrical information into the optical domain at cryogenic temperatures, transmitting the optical signal from cryogenic to room temperature, and then converting the data back into the electrical domain.

Although it is always desirable to reduce energy consumption, it is particularly desirable to do so in low temperature systems. Some energy used for modulation may be dissipated as heat, which can detrimentally affect the performance of low temperature circuits.

Therefore, there is a need to for electro-optical modulators that operate with diminished energy consumption.

SUMMARY

An electro-optic modulator comprises a resonator including a first waveguide having a first end and an opposite second end; a first grating at the first end of the first waveguide; and a second grating at the second end of the first waveguide. An input channel is in optical communication with the resonator, with the input channel comprising a second waveguide having a first end and an opposite second end; an input port at the first end of the second waveguide; a third grating at the second end of the second waveguide; and a first coupler located along the second waveguide and configured to couple light between the second waveguide and the first waveguide of the resonator. An output channel is in optical communication with the resonator, with the output channel comprising a third waveguide having a first end and an opposite second end; an all-pass filter at the first end of the third waveguide; a readout port at the second end of the third waveguide; and a second coupler located along the third waveguide and configured to couple light between the first waveguide of the resonator and the third waveguide. The all-pass filter is configured to adjust a coupling strength between the second coupler and the readout port.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
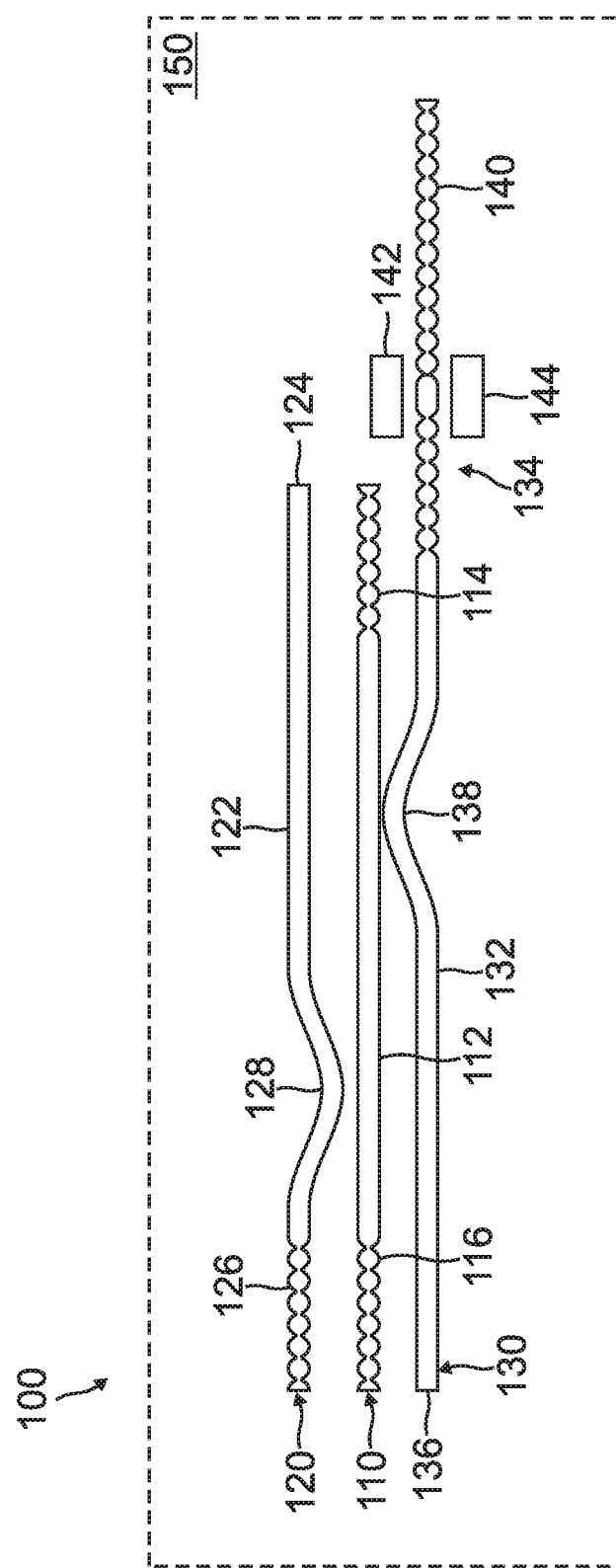
FIG. 1 is a schematic diagram of a low-energy electro-optic modulator (EOM), according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An improved low-energy electro-optic modulator (EOM) architecture, with an electro-optic tunable coupler, is described herein.

In prior Bragg resonator EOMs, a Bragg resonator waveguide is formed in an electro-optic material and corresponding drive electrodes are used to shift the resonant response, thereby modulating an optical signal interacting with the Bragg resonator waveguide. A reflection-based readout provides greater than about 12 dB of signal contrast, but such devices face a major trade-off between low-energy and high-bandwidth operation, in that ultra-low energy-per-bit (EPB) (less than 1 aJ) modulation cannot be accomplished at frequencies greater than 10 GHz due to the optical linewidth of the Bragg resonator EOM.

The present low-energy EOM overcomes the energy-bandwidth trade-off through the introduction of an architecture bearing an ultra-high quality-factor (high-Q) optical cavity that is coupled to a resonant EOM. In some example implementations, the term "high-Q" refers to a Q (quality-factor) that is greater than about 10,000.

The resonant EOM serves as a tunable coupler that modulates optical coupling to and from the high-Q optical cavity. This allows for low EPB operation because only very small electro-optic perturbations must be applied to the resonant EOM tunable coupler arm to achieve substantial modulation in the coupling to and from the high-Q optical cavity. In addition, high bandwidth operation is readily achieved because the linewidth of the resonant EOM tunable coupler can be easily broadened to the point of achieving greater than about a 100 GHz modulation bandwidth, without compromising the signal size and signal-to-noise ratio at the indicated readout port. The bandwidth is determined by the rate at which the coupler comprising the Bragg resonator may be driven, whereas the EPB is determined by the Q-factor of the high-Q resonator.

The low-energy EOM according to the present approach can be fabricated as a dual-cavity modulator, with a single-defect Bragg resonator in a high-confinement waveguide platform with various system components. Such components include modulation electrodes for driving electro-optic response. Standard micro-/nanofabrication processes and tools can be utilized to form the EOM.

Various electro-optic materials can be utilized to form the EOM, such as lithium niobate ($LiNbO_3$), lithium tantalate (LiTaO$_3$), barium titanate (BaTiO$_3$), rubidium titanyl phosphate (RTP), potassium titanyl phosphate (KTP), combinations thereof, or the like.

During operation, a light beam, such as continuous-wave (CW) laser light, is injected into the high-Q resonator of the EOM at a resonant wavelength from an input channel. The power of the light beam ejected at a drop/readout port of the EOM is monitored. A data stream is applied as a driving voltage across the modulation electrodes of the EOM. As the applied voltage switches between discrete, pre-set values, the light circulating within the resonator either continues to resonate or is coupled from the resonator, respectively. The light coupled from the resonator will show up at the drop/readout port. The light at the drop/readout port can be directed into another optical architecture downstream that operates with a modulated optical input signal, or can be detected and converted back into the electrical domain for further processing.

The present EOM can be implemented in various platforms, such as cryogenic platforms useful in quantum computing; precision timing atomic clocks; inertial sensing platforms such as an inertial measurement unit (IMU); and as a component in a fiber optic gyroscope (FOG).

The present EOM is estimated through modeling to have a performance of less than 1 aJ EPB at 100 GHz bandwidth.

Further details of various embodiments are described hereafter with reference to the drawings.

FIG. 1 is a schematic diagram of an EOM 100, according to one embodiment. The EOM 100 generally includes a resonator 110, an input channel 120 in optical communication with resonator 110, and an output channel 130 in optical communication with resonator 110. The resonator 110, input channel 120, and output channel 130 can be formed in substantially parallel rows with respect to each other on a substrate 150, using standard microfabrication techniques.

The resonator 110 comprises a first waveguide 112, a first grating 114 formed at a first end of waveguide 112, and a second grating 116 formed at an opposite second end of waveguide 112. In one implementation, resonator 110 can be formed as a high-Q resonator using electro-optic materials, such as lithium niobate. In one embodiment, first and second gratings 114, 116 can be Bragg gratings.

The input channel 120 comprises a second waveguide 122, an input port 124 at a first end of waveguide 122, and a third grating 126 formed at an opposite second end of waveguide 122. A first coupler 128 is located along waveguide 122 and is configured to couple light between waveguide 122 and waveguide 112 of resonator 110. In one implementation, input channel 120 can be formed of electro-optic materials, such as lithium niobate. In one embodiment, third grating 126 can be a Bragg grating.

The output channel 130 comprises a third waveguide 132, an all-pass filter 134 at a first end of waveguide 132, and a readout port 136 at an opposite second end of waveguide 132. The all-pass filter 134 comprises one or more gratings 140, and a pair of modulation electrodes 142, 144 on respective opposing sides of the one or more gratings 140. A second coupler 138 is located along waveguide 132 and is configured to couple light between waveguide 112 of resonator 110 and waveguide 132. The all-pass filter 134 is configured to adjust a coupling strength between second coupler 138 and readout port 136. In one implementation, output channel 130 can be formed of electro-optic materials, such as lithium niobate. In one embodiment, the one or more gratings 140 can be Bragg gratings.

Further details with respect to techniques for fabricating Bragg gratings, which are suitable for use in EOM 100, are described in U.S. application Ser. No. 15/956,610, entitled "APPARATUSES AND METHODS FOR LOW ENERGY DATA MODULATION," the disclosure of which is incorporated herein by reference.

During operation of EOM 100, a light beam, such as a CW laser beam, is injected through input port 124 into waveguide 122 of input channel 120. A portion of the light beam is coupled from waveguide 122 into resonator 110 by first coupler 128. The remaining portion of the light in waveguide 122 reflects off grating 126 and continues to traverse through waveguide 122. The portion of the light beam coupled into resonator 110 oscillates between first grating 114 and second grating 116 along waveguide 112. This light beam within resonator 110 oscillates until either the light beam escapes through first coupler 128, dissipates through random variance, or escapes through second coupler 138 into output channel 130.

The light beam entering output channel 130 at second coupler 138 travels towards all-pass filter 134, or towards readout port 136. A portion of the light beam traveling towards all-pass filter 134 is reflected. This portion of the light beam is determined by the configuration of all-pass filter 134. The one or more gratings 140 form a resonant cavity across which electrodes 142, 144 run a potential. In a first state, electrodes 142, 144 are powered off, and in a second state, electrodes 142, 144 are powered on. While there are intermediate states, all-pass filter 134 serves as a gate for the light beam traveling through second coupler 138. The light beam reflecting off of all-pass filter 134 rejoins the light beam traveling towards the readout port 136 from coupler 138. This light travels through the third waveguide 132 and exits at readout port 136.

Figure 2A:
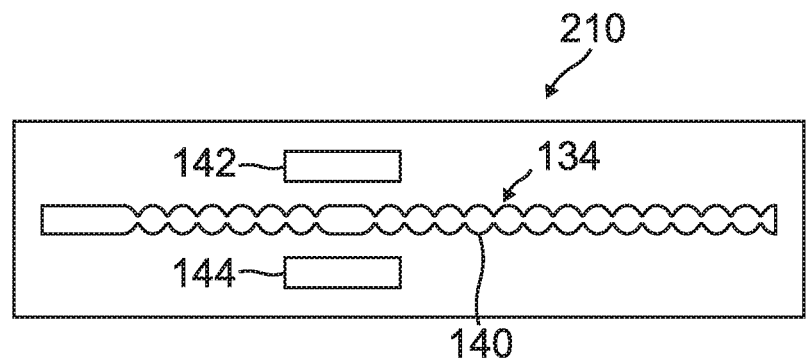
FIGS. 2A-2C are schematic diagrams illustrating various components of the EOM of FIG. 1.
Figure 2B:
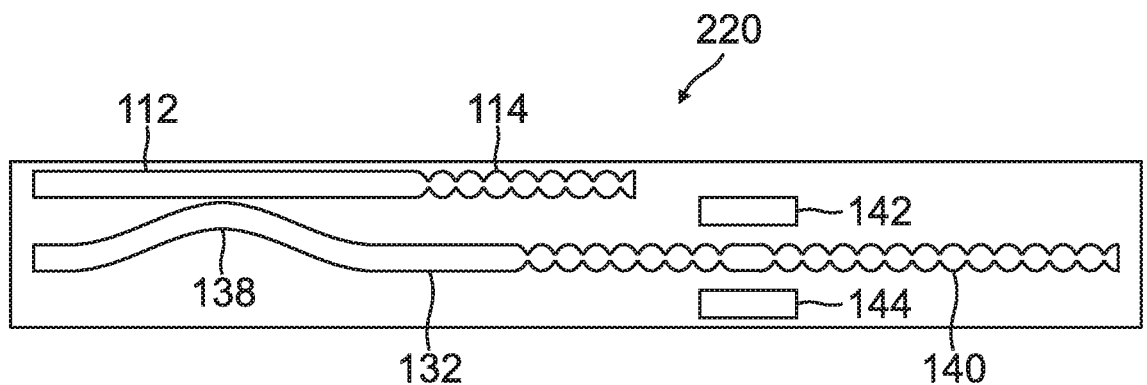
Figure 2C:
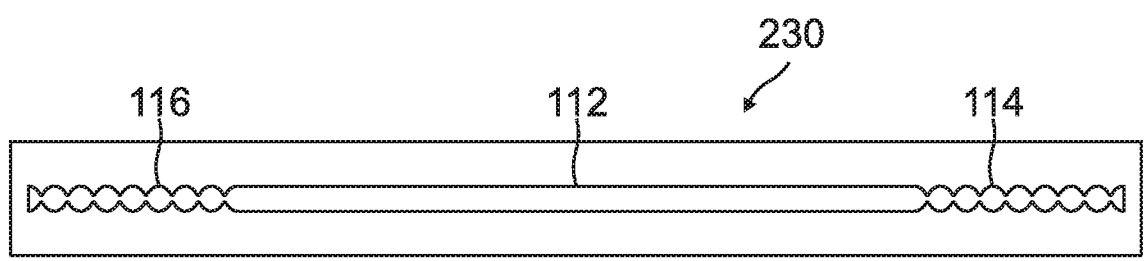

FIGS. 2A-2C are schematic diagrams illustrating the various components of an EOM, such as EOM 100.

FIG. 2A illustrates a filter portion 210 of the EOM, which includes all-pass filter 134 having gratings 140 such as Bragg gratings and modulation electrodes 142, 144, which form a Bragg resonator. The modulation electrodes can be composed of conductive materials such as gold.

FIG. 2B illustrates a tunable coupler portion 220 of the EOM, which contains the Bragg resonator formed by Bragg gratings 140 and modulation electrodes 142, 144. The tunable coupler portion 220 also includes second coupler 138 along waveguide 132, and a portion of waveguide 112 with grating 114 such as a Bragg grating.

FIG. 2C illustrates a high-Q resonator portion 230 of the EOM. The high-Q resonator portion 230 includes waveguide 112, with gratings 114 and 116, such as Bragg gratings, formed at opposite ends of waveguide 112.

During operation, an optical signal is coupled into high-Q resonator portion 230 from an input port, such as input port 124 of input channel 120 (FIG. 1). The tunable coupler portion 220, containing the Bragg resonator, controls the optical signal at a drop/readout port, such as readout port 136 of output channel 130 (FIG. 1), by modulating the optical signal coupling out of high-Q resonator portion 230. This modulation (switching) can be done at the bandwidth permitted by tunable coupler portion 220, enabling high-bandwidth operation. Further, smaller perturbations to the Bragg resonator are required when operating the EOM with the tunable coupler, than with just the EOM itself.

Figure 3:
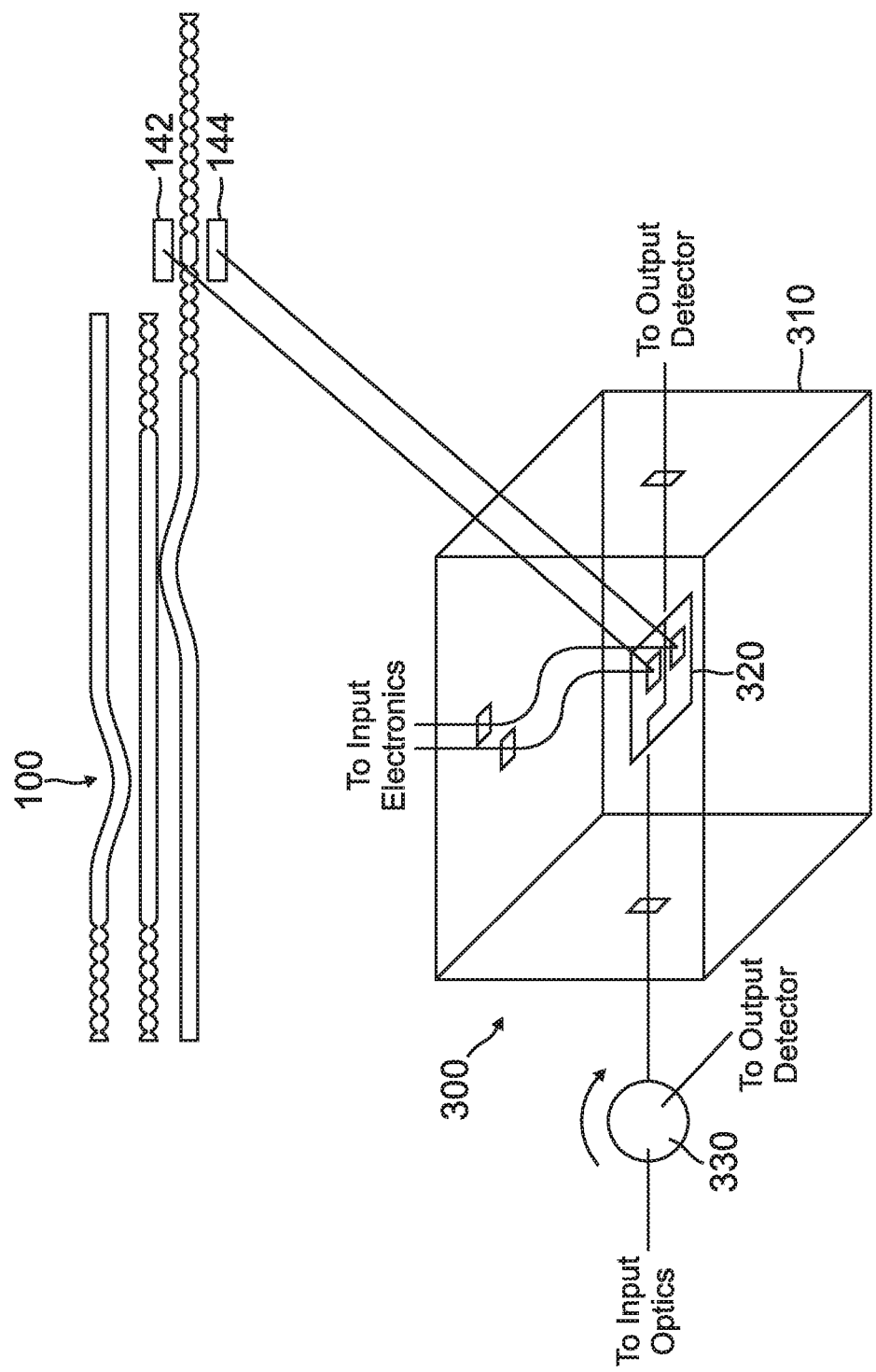
FIG. 3 is a schematic illustration of a platform implementation of the EOM of FIG. 1, according to an exemplary embodiment.

FIG. 3 is a schematic illustration of one implementation of the present EOM, such as EOM 100 in a system platform 300, such as a cryogenic platform. The platform 300 includes a housing 310 such as a cryogenic refrigerator, which contains EOM 100 on a photonics chip 320. The photonics chip 320 operatively communicates with input electronics outside of housing 310. A set of input optics provide optical communication with EOM 100 through an optical circulator 330 that is outside of housing 310. The EOM 100 also optically communicates with one or more output detectors that are outside of housing 310, such as through optical circulator 330. The modulation electrodes 142, 144 are used to shift the resonant response of EOM 100, thereby modulating the optical signals interacting with EOM 100. Reflection-based optical readout signals are sent to the output detectors for conversion of the optical readout signals to the electrical domain.

Figure 4:
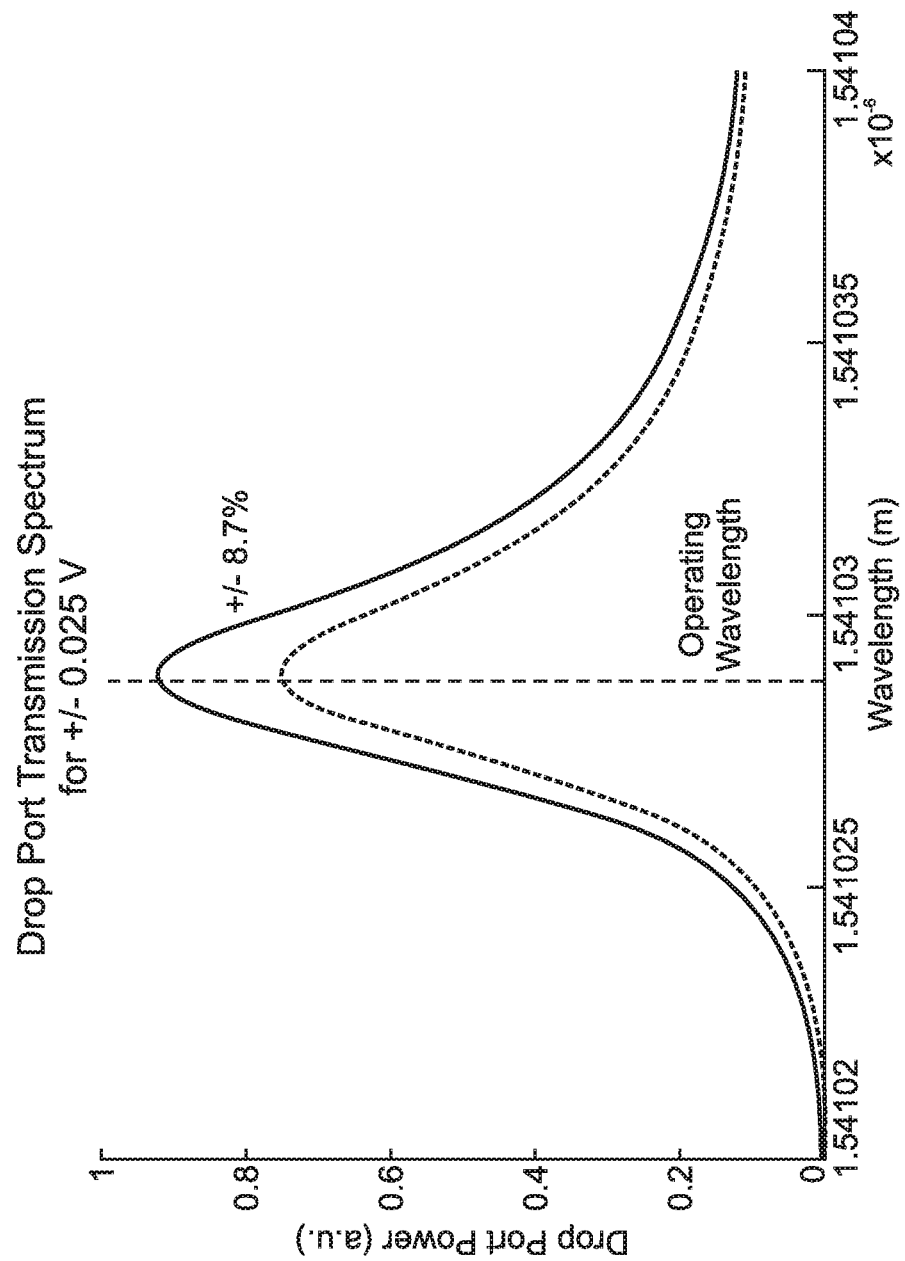
FIG. 4 is a graph of the simulated performance of a low-energy EOM with a tunable coupler.

FIG. 4 is a graph of the simulated performance of an EOM with tunable coupler, showing an exemplary drop (readout) port transmission spectrum. In particular, FIG. 4 shows the normalized drop port power with respect to an operating wavelength for an optical signal that passes through the EOM to a detector. At the desired resonance frequency, the transmission power increases to about 1, and away from resonance the transmission drops to 0. The difference in peak height between the two curves in FIG. 4 is basically the signal strength/modulation depth, which switches between about 93% and about 75.6% in the two states.

Example Embodiments

Example 1 includes an electro-optic modulator, comprising: a resonator that comprises a first waveguide having a first end and an opposite second end; a first grating at the first end of the first waveguide; and a second grating at the second end of the first waveguide; an input channel in optical communication with the resonator, the input channel comprising: a second waveguide having a first end and an opposite second end; an input port at the first end of the second waveguide; a third grating at the second end of the second waveguide; and a first coupler located along the second waveguide and configured to couple light between the second waveguide and the first waveguide of the resonator; and an output channel in optical communication with the resonator, the output channel comprising: a third waveguide having a first end and an opposite second end; an all-pass filter at the first end of the third waveguide; a readout port at the second end of the third waveguide; and a second coupler located along the third waveguide and configured to couple light between the first waveguide of the resonator and the third waveguide; wherein the all-pass filter is configured to adjust a coupling strength between the second coupler and the readout port.

Example 2 includes the electro-optic modulator of Example 1, wherein at least one of the first grating, the second grating, and the third grating are a Bragg grating.

Example 3 includes the electro-optic modulator of any of Examples 1-2, wherein at least one of the first waveguide, the second waveguide, and the third waveguide comprise an electro-optic material.

Example 4 includes the electro-optic modulator of Example 4, wherein the electro-optic material comprises lithium niobate, lithium tantalate, barium titanate, rubidium titanyl phosphate, potassium titanyl phosphate, or combinations thereof.

Example 5 includes the electro-optic modulator of any of Examples 1-4, wherein the all-pass filter comprises: one or more Bragg gratings; and a pair of modulation electrodes on respective opposing sides of the one or more Bragg gratings; wherein the modulation electrodes are configured to apply a voltage across the third waveguide.

Example 6 includes the electro-optic modulator of Example 5, wherein a tunable coupler portion of the electro-optic modulator includes: a Bragg resonator formed by the one or more Bragg gratings and the modulation electrodes; the second coupler along the third waveguide; and a portion of the first waveguide with the first grating.

Example 7 includes the electro-optic modulator of Example 6, wherein the resonator is a high-Q resonator.

Example 8 includes the electro-optic modulator of Example 7, wherein when an optical signal is coupled into the high-Q resonator, the tunable coupler portion containing the Bragg resonator controls the optical signal at the readout port, by modulating the optical signal coupling out of the high-Q resonator.

Example 9 includes the electro-optic modulator of any of Examples 1-8, further comprising a sensor coupled to the readout port, wherein the sensor is configured to measure optical data output at the readout port.

Example 10 includes the electro-optic modulator of any of Examples 1-9, wherein the resonator, the input channel, and the output channel are arranged in substantially parallel rows with respect to each other on a substrate.

Example 11 includes the electro-optic modulator of any of Examples 1-10, wherein the electro-optic modulator is implemented in a photonics chip.

Example 12 includes the electro-optic modulator of Example 11, wherein the photonics chip is implemented in a cryogenic platform.

Example 13 includes the electro-optic modulator of Example 11, wherein the photonics chip is implemented for precision timing via an atomic clock.

Example 14 includes the electro-optic modulator of Example 11, wherein the photonics chip is implemented in an inertial sensing platform.

Example 15 includes the electro-optic modulator of Example 11, wherein the photonics chip is implemented as a component in a fiber optic gyroscope.

Example 16 includes a method of operating the electro-optic modulator of any of Examples 1-15, the method comprising: injecting a light beam through the input port into the second waveguide of the input channel; coupling a portion of the light beam from the second waveguide into the resonator by the first coupler; and oscillating the portion of the light beam in the resonator between the first grating and the second grating along the first waveguide; wherein the portion of the light beam in the resonator oscillates until escaping through the first coupler, dissipating through random variance, or escaping through the second coupler into the output channel; wherein the portion of the light beam escaping through the second coupler into the output channel travels towards the all-pass filter or towards the readout port; wherein the all pass filter is configured to shift a resonant response of the electro-optic modulator to thereby modulate the portion of the light beam in the output channel to produce a reflection-based readout signal.

Example 17 includes a system that implements the electro-optic modulator of any of Examples 1-15, the system comprising: a housing; a photonics chip within the housing, wherein the electro-optic modulator is coupled to the photonics chip; a set of input electronics outside of the housing and in operative communication with the all-pass filter in the output channel of the electro-optic modulator; a set of input optics outside of the housing and configured to provide input optical signals to the input channel of the electro-optic modulator; and one or more output detectors outside of the housing and in optical communication with the output channel of the electro-optic modulator; wherein the all pass filter is configured to shift a resonant response of the electro-optic modulator to thereby modulate the input optical signals interacting with the electro-optic modulator to produce reflection-based optical readout signals; wherein the reflection-based optical readout signals are sent to the one or more output detectors from the output channel for conversion of the optical readout signals to electrical signals.

Example 18 includes the system of Example 17, wherein the housing comprises a cryogenic refrigerator.

Example 19 includes the system of any of Examples 17-18, wherein the set of input optics provides the input optical signals through an optical circulator outside of the housing.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An electro-optic modulator, comprising:
   a linear resonator comprising:
      a first waveguide having a first end and an opposite second end;
      a first grating at the first end of the first waveguide; and
      a second grating at the second end of the first waveguide;
   an input channel in optical communication with the linear resonator, the input channel comprising:
      a second waveguide having a first end and an opposite second end;
      an input port at the first end of the second waveguide;
      a third grating at the second end of the second waveguide; and
      a first coupler located along the second waveguide and configured to couple a light beam between the second waveguide and the first waveguide of the linear resonator; and
   an output channel in optical communication with the linear resonator, the output channel comprising:
      a third waveguide having a first end and an opposite second end;
      an all-pass filter at the first end of the third waveguide;
      a readout port at the second end of the third waveguide; and
      a second coupler located along the third waveguide and configured to couple the light beam between the first waveguide of the linear resonator and the third waveguide;
   wherein the all-pass filter is configured to adjust a coupling strength between the second coupler and the readout port;
   wherein the all-pass filter includes modulation electrodes configured to drive an electro-optic response and shift a resonant response of the electro-optic modulator;
   wherein a first portion of the light beam is coupled by the second coupler into the third waveguide and travels toward the all-pass filter, and a second portion of the light beam is coupled by the second coupler into the third waveguide and travels toward the readout port;
   wherein the all-pass filter is configured as a gate such that:
      when the modulation electrodes are powered on, the first portion of the light beam is reflected from the all-pass filter and is phase modulated with respect to the second portion of the light beam to produce a reflection-based readout signal; and
      when the modulation electrodes are powered off, the first portion of the light beam that is reflected from the all-pass filter destructively interferes with the second portion of the light beam such that there is no readout signal.

2. The electro-optic modulator of claim 1, wherein at least one of the first grating, the second grating, and the third grating are a Bragg grating.

3. The electro-optic modulator of claim 1, wherein at least one of the first waveguide, the second waveguide, and the third waveguide comprise an electro-optic material.

4. The electro-optic modulator of claim 3, wherein the electro-optic material comprises lithium niobate, lithium tantalate, barium titanate, rubidium titanyl phosphate, potassium titanyl phosphate, or combinations thereof.

5. The electro-optic modulator of claim 1, wherein the all-pass filter comprises:
   one or more Bragg gratings; and
   a pair of modulation electrodes on respective opposing sides of the one or more Bragg gratings;
   wherein the modulation electrodes are configured to apply a voltage across the third waveguide.

6. The electro-optic modulator of claim 5, wherein a tunable coupler portion of the electro-optic modulator includes:
   a Bragg resonator formed by the one or more Bragg gratings and the modulation electrodes;
   the second coupler along the third waveguide; and
   a portion of the first waveguide with the first grating.

7. The electro-optic modulator of claim 6, wherein the linear resonator is a high-Q resonator.

8. The electro-optic modulator of claim 7, wherein when an optical signal is coupled into the high-Q resonator, the tunable coupler portion containing the Bragg resonator controls the optical signal at the readout port, by modulating the optical signal coupling out of the high-Q resonator.

9. The electro-optic modulator of claim 1, further comprising a sensor coupled to the readout port, wherein the sensor is configured to measure optical data output at the readout port.

10. The electro-optic modulator of claim 1, wherein the linear resonator, the input channel, and the output channel are arranged in substantially parallel rows with respect to each other on a substrate.

11. The electro-optic modulator of claim 1, wherein the electro-optic modulator is implemented in a photonics chip.

12. The electro-optic modulator of claim 11, wherein the photonics chip is implemented in a cryogenic platform.

13. The electro-optic modulator of claim 11, wherein the photonics chip is implemented for precision timing via an atomic clock.

14. The electro-optic modulator of claim 11, wherein the photonics chip is implemented in an inertial sensing platform.

15. The electro-optic modulator of claim 11, wherein the photonics chip is implemented as a component in a fiber optic gyroscope.

16. A method of operating the electro-optic modulator of claim 1, the method comprising:
   injecting a light beam through the input port into the second waveguide of the input channel;
   coupling a portion of the light beam from the second waveguide into the linear resonator by the first coupler; and
   oscillating the portion of the light beam in the linear resonator between the first grating and the second grating along the first waveguide;

wherein the portion of the light beam in the linear resonator oscillates until escaping through the first coupler, dissipating through random variance, or escaping through the second coupler into the output channel;

wherein the portion of the light beam escaping through the second coupler into the output channel travels towards the all-pass filter or towards the readout port.

17. A system that implements the electro-optic modulator of claim 1, the system comprising:

a housing;

a photonics chip within the housing, wherein the electro-optic modulator is coupled to the photonics chip;

a set of input electronics outside of the housing and in operative communication with the all-pass filter in the output channel of the electro-optic modulator;

a set of input optics outside of the housing and configured to provide input optical signals to the input channel of the electro-optic modulator; and one or more output detectors outside of the housing and in optical communication with the output channel of the electro-optic modulator;

wherein the all-pass filter is configured to shift a resonant response of the electro-optic modulator to thereby modulate the input optical signals interacting with the electro-optic modulator to produce reflection-based optical readout signals;

wherein the reflection-based optical readout signals are sent to the one or more output detectors from the output channel for conversion of the optical readout signals to electrical signals.

18. The system of claim 17, wherein the housing comprises a cryogenic refrigerator.

19. The system of claim 17, wherein the set of input optics provides the input optical signals through an optical circulator outside of the housing.

20. The electro-optic modulator of claim 1, wherein the electro-optic modulator is configured to operate at greater than about 100 GHz modulation bandwidth, and at less than about 1 aJ energy-per-bit (EPB).

* * * * *